United States Patent
Vanzandt et al.

(10) Patent No.: US 9,586,171 B2
(45) Date of Patent: Mar. 7, 2017

(54) SYSTEM AND METHOD FOR REGENERATING ADSORBER BED FOR DRYING COMPRESSED HUMIDIFIED HYDROGEN

(71) Applicant: Nuvera Fuel Cells, Inc., Billerica, MA (US)

(72) Inventors: Kyle Vanzandt, Allston, MA (US); Bryan Gordon, Goffstown, NH (US)

(73) Assignee: NUVERA FUEL CELLS, INC., Billerica, MA (US)

( * ) Notice: Subject to any disclaimer, the term of this patent is extended or adjusted under 35 U.S.C. 154(b) by 22 days.

(21) Appl. No.: 14/754,952

(22) Filed: Jun. 30, 2015

(65) Prior Publication Data

US 2016/0001215 A1    Jan. 7, 2016

Related U.S. Application Data

(60) Provisional application No. 62/020,475, filed on Jul. 3, 2014.

(51) Int. Cl.
*C01B 3/56* (2006.01)
*C25B 1/12* (2006.01)
(Continued)

(52) U.S. Cl.
CPC ........... *B01D 53/047* (2013.01); *B01D 53/04* (2013.01); *B01D 53/261* (2013.01); *C01B 3/32* (2013.01);
(Continued)

(58) Field of Classification Search
CPC .. B01D 53/04; B01D 53/047; B01D 53/0473; B01D 53/261; B01D 2256/16;
(Continued)

(56) References Cited

U.S. PATENT DOCUMENTS 3,614,872 A * 10/1971 Tassoney ................ C01B 3/506
62/54.2
4,469,665 A * 9/1984 Pinto ....................... B01D 53/04
423/359

(Continued)

FOREIGN PATENT DOCUMENTS

| DE | 1619941 A1 | 7/1971 |
|---|---|---|
| GB | 977969 A | 12/1964 |
| GB | 1200550 A | 7/1970 |

OTHER PUBLICATIONS

Anonymous, Chemical Abstracts, vol. 93, Oct. 18, 1980, XP001713817.

(Continued)

*Primary Examiner* — Frank Lawrence
(74) *Attorney, Agent, or Firm* — Finnegan, Henderson, Farabow, Garrett & Dunner, LLP (57) ABSTRACT

A system for compressing and drying hydrogen is provided. The system may have a humidifier configured to receive and humidify a concentrated hydrogen stream and produce a first humidified hydrogen stream. The system may also have a compressor configured to receive and compress the first humidified hydrogen stream, and produce a pressurized humidified hydrogen stream. The system may further have a dryer including a first bed configured to in production mode receive the pressurized humidified hydrogen stream, adsorb at least a portion of the humidity, and produce a product hydrogen stream. The first bed may further be configured to in regeneration mode receive a portion of the concentrated hydrogen stream to regenerate the first bed, and produce a second humidified hydrogen stream.

17 Claims, 5 Drawing Sheets

(51) Int. Cl.
*B01D 53/04* (2006.01)
*B01D 53/047* (2006.01)
*C01B 3/32* (2006.01)
*B01D 53/26* (2006.01)

(52) U.S. Cl.
CPC ............... *C01B 3/56* (2013.01); *C25B 1/12* (2013.01); *B01D 53/0473* (2013.01); *B01D 2256/16* (2013.01); *B01D 2257/108* (2013.01); *B01D 2257/502* (2013.01); *B01D 2259/40001* (2013.01); *B01D 2259/402* (2013.01); *B01D 2259/40052* (2013.01); *C01B 2203/0205* (2013.01); *C01B 2203/0233* (2013.01); *C01B 2203/042* (2013.01); *C01B 2203/043* (2013.01); *C01B 2203/0495* (2013.01); *C01B 2203/1211* (2013.01)

(58) Field of Classification Search
CPC ........ B01D 2257/108; B01D 2257/502; B01D 2258/40001; B01D 2258/40052; B01D 2258/402; C25B 1/12; C01B 3/32; C01B 3/56; C01B 2203/0205; C01B 2203/0233; C01B 2203/042; C01B 2203/043; C01B 2203/0495; C01B 2203/1211
USPC ..... 95/96–98, 104, 105, 117, 121, 122, 139, 95/140; 96/121, 130
See application file for complete search history.

(56) References Cited

U.S. PATENT DOCUMENTS

| | | | |
|---|---|---|---|
| 4,482,369 A * | 11/1984 | Carson | C10G 49/22 62/619 |
| 6,007,606 A * | 12/1999 | Baksh | B01D 53/053 95/101 |
| 6,340,382 B1 * | 1/2002 | Baksh | C01B 3/56 95/117 |
| 2004/0040862 A1 | 3/2004 | Kosek et al. | |
| 2008/0236396 A1 | 10/2008 | Moulthrop et al. | |
| 2009/0071332 A1 * | 3/2009 | Kaul | C10G 45/02 95/96 |
| 2016/0059184 A1 * | 3/2016 | Li | C25B 1/02 204/242 |

OTHER PUBLICATIONS

PCT Notification of Transmittal of the International Search Report and the Written Opinion of the International Searching Authority issued in International Patent Application No. PCT/US2015/038550 dated Oct. 23, 2015.

* cited by examiner

SYSTEM AND METHOD FOR REGENERATING ADSORBER BED FOR DRYING COMPRESSED HUMIDIFIED HYDROGEN

This application claims the benefit of U.S. Provisional Application No. 62/020,475, filed Jul. 3, 2014, which is incorporated by reference in its entirety.

The present disclosure is directed towards a system and method for regenerating an adsorber bed, and more particularly, an adsorber bed used for drying compressed humidified hydrogen.

Hydrogen has emerged as a viable alternative to traditional power sources. Successful commercialization of hydrogen as an energy carrier and the long-term sustainability of a "hydrogen economy" depends largely on the efficiency and cost-effectiveness of hydrogen fuel cells, hydrogen electrolysis cells, hydrogen generation, hydrogen manipulation/management systems (e.g., compressors), and hydrogen distribution systems.

Figure 1:
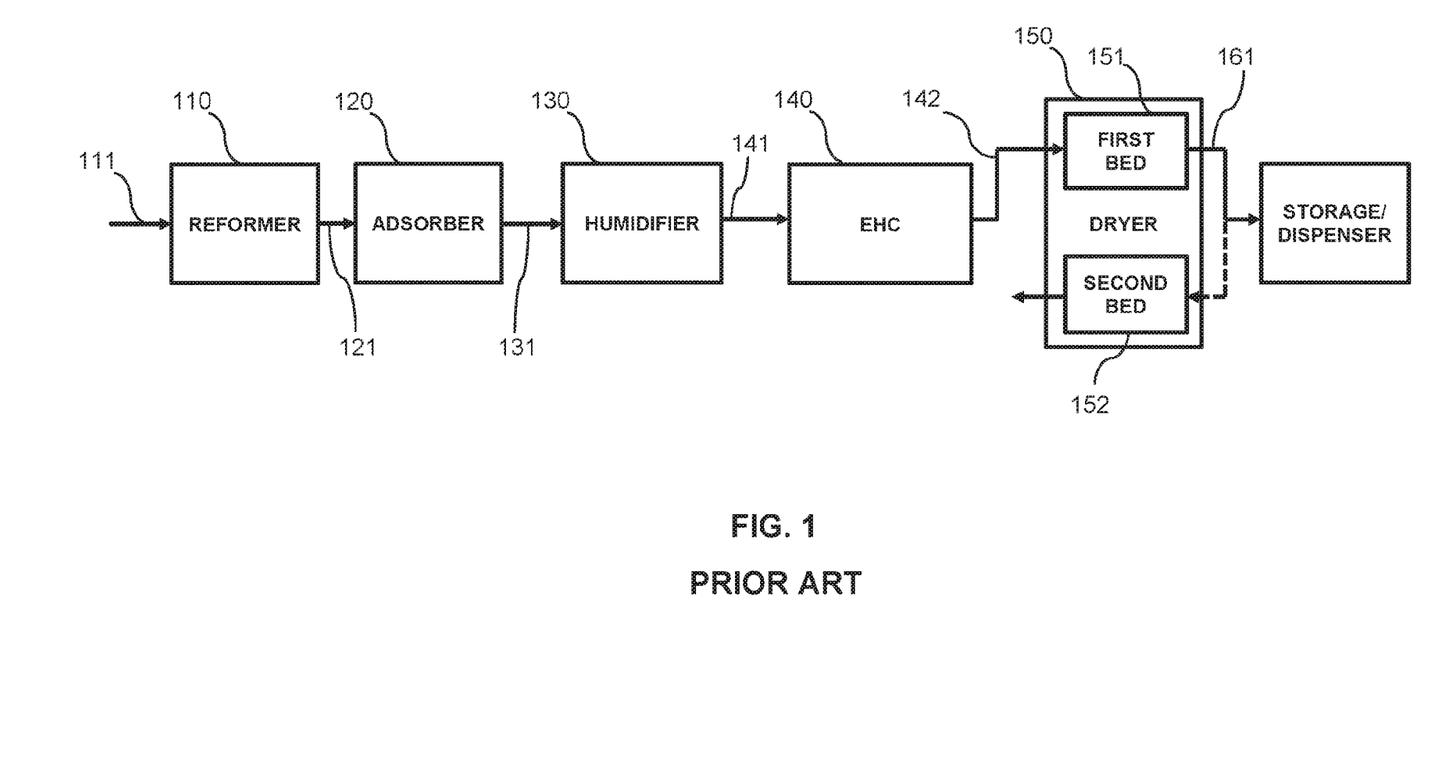
FIG. 1 is flow schematic of a system for producing, compressing, and drying hydrogen for storage.

Presently fossil fuels are a major source of industrial hydrogen. Hydrogen can be generated from natural gas or from other hydrocarbons. A popular method by which hydrogen may be generated for storage is by steam reforming methane or natural gas 111 using a reformer 110, which produces syngas 121, as shown in FIG. 1. Syngas is a mixture consisting primarily of hydrogen, carbon dioxide and very often some carbon monoxide. The hydrogen within syngas 121 may be purified by passing it through an adsorber 120 configured to remove the carbon monoxide and any carbon dioxide leaving a concentrated hydrogen stream 131. Gaseous hydrogen is a convenient and efficient means of energy storage, usually by pressurized containment. Advantageously, storing hydrogen at high pressure yields high energy density.

Mechanical compression is a traditional means to achieve compression. However, there are disadvantages to mechanical compression. For example, substantial energy usage, wear and tear on moving parts, excessive noise, bulky equipment, and hydrogen embrittlement. Pressurization by thermal cycling is an alternative to mechanical compression, but like mechanical compression the energy usage is substantial. In contrast, electrochemical compression using an electrochemical hydrogen compressor (EHC) is quiet, scalable, modular, and can achieve high energy efficiency. Accordingly, concentrated hydrogen stream 131, produced by adsorber 120, may be compressed for pressurized storage by an EHC 140.

EHC 140 can be used to selectively transfer hydrogen from one side of a cell to another. EHC 140 can comprise, for example, a proton exchange membrane sandwiched between a first electrode (i.e., an anode) and a second electrode (i.e., a cathode). A gas containing hydrogen can contact the first electrode and an electric potential difference can be applied between the first and second electrodes. At the first electrode, the hydrogen molecules can be oxidized and the reaction can produce two electrons and two protons. The two protons can be electrochemically driven through the membrane to the second electrode of the cell, where they can be rejoined by two rerouted electrons and reduced to form a hydrogen molecule. EHCs operating in this manner are sometimes referred to as a hydrogen pumps. When the hydrogen accumulated at the second electrode is restricted to a confined space, the electrochemical cell compresses the hydrogen or raises the pressure.

An EHC containing a PEM fuel cell requires a certain level of humidity to facilitate conductivity of the membrane. A PEM membrane that is less than fully hydrated can cause a decrease in protonic conductivity and may result in resistive loss, decreased performance, and decreased membrane life. On the other hand, the presence of too much humidity in the membrane may flood the membrane, potentially blocking flow channels through the membrane and negatively affecting performance and operational lifetime. Therefore, concentrated hydrogen stream 131, before entering EHC 140, can pass through a humidifier 130, producing a humidified hydrogen stream 141, as shown in FIG. 1

Humidified hydrogen stream 141 may be compressed producing a pressurized humidified hydrogen stream 142. Prior to storage it is advantageous to pass pressurized humidified hydrogen stream 142 through a dryer 150 in order to lower the humidity level to within the desired range for storage and later utilization. The desired humidity threshold can vary for different applications. For example, one standard is SAE-J2719, which calls for 5 parts per million (ppm). In some embodiments, the humidity threshold can be equal to or less than 5 ppm (i.e, minus 70° C. dew point). Accordingly, as shown in FIG. 1, pressurized humidified hydrogen stream 142 can be supplied to dryer 150 having a first bed 151 and a second bed 152. Humidified hydrogen stream 142 may be supplied to the one or more beds (e.g., first bed 151 and a second bed 152), which are online and in production mode. Dryer 150 may utilize pressure swing adsorption within first bed 151 and/or second bed 152 while in production mode to adsorb at least a portion of the humidity from pressurized humidified hydrogen stream 142, producing a product hydrogen stream 161. After a period, the online bed (i.e., first bed 151 or second bed 152) operating in production mode will become saturated at which time it is preferred that it be taken offline and switched to a regeneration mode. When one bed is switched to regeneration mode the other bed can be switched to production mode to enable continuous hydrogen dehumidification.

A traditional method of regenerating an exhausted bed is by blowing down the bed (e.g., countercurrent to production flow direction) using product hydrogen stream 161 to remove the impurities from the exhausted bed. However, utilizing product hydrogen stream 152 for blow down decreases the overall throughput capacity of EHC 140 and dryer 150, increases the runtime required to produce a given volume of product hydrogen 152 for final storage, reducing overall system efficiency and diminishing the economic viability of hydrogen as a fuel source.

In consideration of the aforementioned circumstances, the present disclosure provides an improved method and system for regenerating an adsorber bed used for drying pressurized humidified hydrogen.

In one aspect, the present disclosure is directed to a system for compressing and drying hydrogen. The system may include a humidifier configured to receive and humidify a concentrated hydrogen stream and produce a first humidified hydrogen stream. The system may further include a compressor configured to receive and compress the first humidified hydrogen stream, and produce a pressurized humidified hydrogen stream. The system may also include a dryer including a first bed being configured to, in production mode receive the pressurized humidified hydrogen stream and adsorb at least a portion of the humidity, and produce a product hydrogen stream. The first bed may further be configured to, in regeneration mode receive a portion of the concentrated hydrogen stream to regenerate the first bed, and produce a second humidified hydrogen stream.

In another aspect, the present disclosure is directed to a method of operating a dryer, wherein the dryer has a first bed and a second bed. The method may include humidifying a concentrated hydrogen stream to produce a first humidified hydrogen stream. The method may further include regenerating the first bed using a portion of the concentrated hydrogen stream, producing a second humidified hydrogen stream. The method may also include pressurizing the first humidified hydrogen stream and the second humidified hydrogen stream to produce a pressurized humidified hydrogen stream. The method may further include drying the pressurized humidified hydrogen stream in a second bed producing a product hydrogen stream.

In another aspect, the present disclosure is directed to a dryer configured for drying a pressurized hydrogen stream. The dryer may include a first bed being configured to in production mode receive the pressurized humidified hydrogen stream and adsorb at least a portion of the humidity, producing a product hydrogen stream. The first bed may further be configured to in regeneration mode receive a portion of a concentrated hydrogen stream to regenerate the first bed producing a second humidified hydrogen stream, and supply the second humidified hydrogen stream to a compressor. The dryer may also include a second bed being configured to in production mode receive the pressurized humidified hydrogen stream and adsorb at least a portion of the humidity, producing a product hydrogen stream. The second bed may further be configured to in regeneration mode receive a portion of the concentrated hydrogen stream to regenerate the second bed producing a second humidified hydrogen stream, and supply the second humidified hydrogen stream to the compressor.

Additional objects and advantages of the present disclosure will be set forth in part in the description which follows, and in part will be obvious from the description, or may be learned by practice of the present disclosure. The objects and advantages of the present disclosure will be realized and attained by means of the elements and combinations particularly pointed out in the appended claims.

It is to be understood that both the foregoing general description and the following detailed description are exemplary and explanatory only and are not restrictive of the present disclosure as claimed.

The accompanying drawings, which are incorporated in and constitute a part of this specification, illustrate one (several) embodiment(s) of the present disclosure and together with the description, serve to explain the principles of the present disclosure.

Reference will now be made in detail to the present exemplary embodiments of the present disclosure, and examples of which are illustrated in the accompanying drawings. Wherever possible, the same reference numbers will be used throughout the drawings to refer to the same or like parts.

The present disclosure is described herein with reference to an illustrative embodiment for a particular application, such as, for example, producing, compressing, and drying hydrogen. It is understood that the embodiments described herein are not limited thereto. Those having ordinary skill in the art and access to the teachings provided herein will recognize additional modifications, applications, embodiments, and substitution of equivalents that all fall with the scope of the present disclosure. Accordingly, the present disclosure is not limited by the foregoing or following descriptions.

Figure 2:
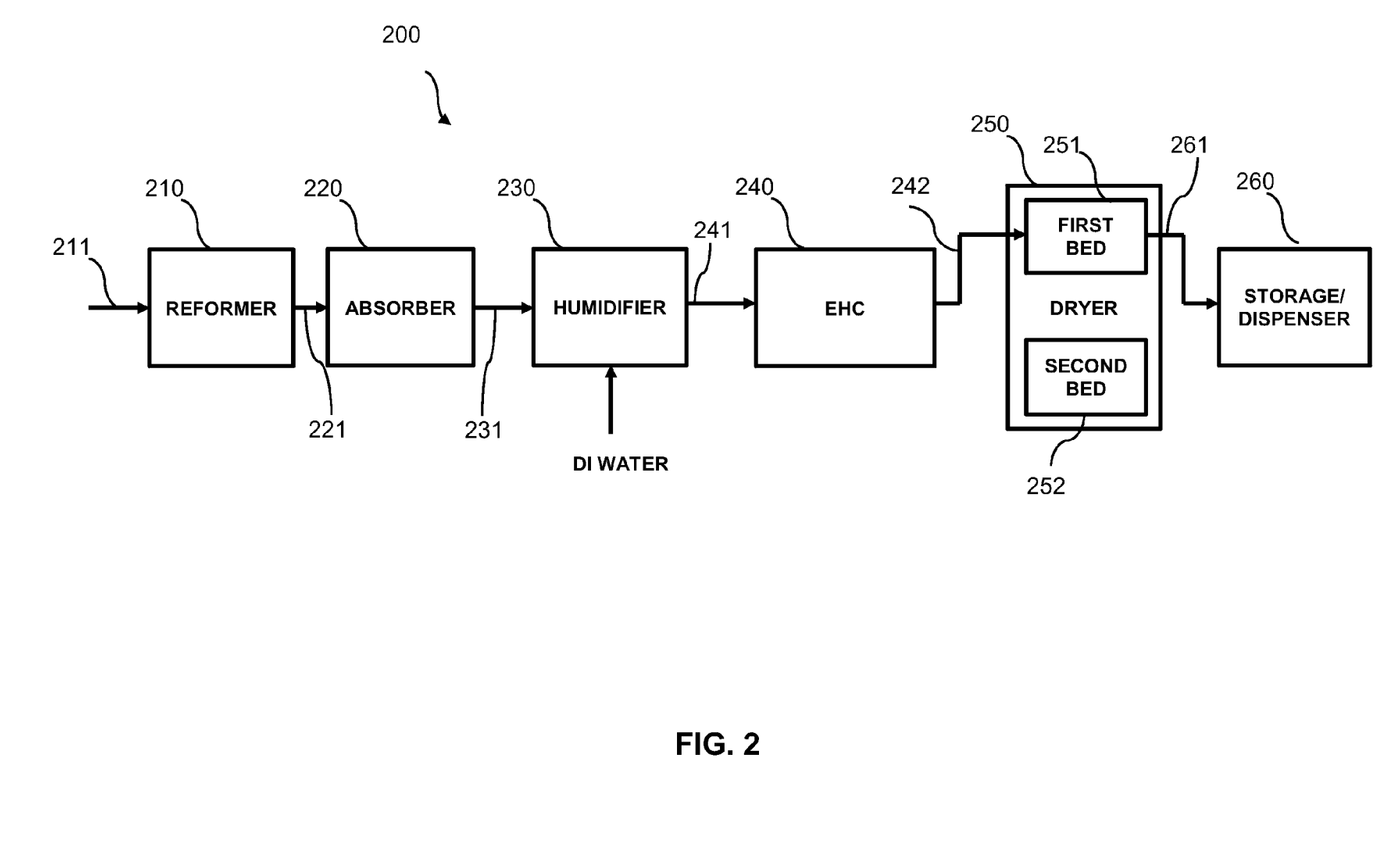
FIG. 2 is a flow schematic of a system for producing, compressing, and drying hydrogen for storage, according to an exemplary embodiment.

FIG. 2 illustrates a hydrogen processing system 200, for producing, purifying, compressing, and drying hydrogen for pressurized storage and dispensing. System 200 may include a reformer 210, an adsorber 220, a humidifier 230, an EHC 240, a dryer 250 having a first bed 251 and a second bed 252, and a storage dispenser 260. System 200 as illustrated in FIG. 2 may be operating, wherein first bed 251 may be online in production mode and second bed 252 may be on standby.

Reformer 210 may be a steam reformer configured to react steam at high temperature (e.g., 700 to 1100° C.) with a fossil fuel (e.g., natural gas, methanol, etc). Steam at high temperature, in the presence of a metal based catalyst (e.g., nickel), reacts with fossil fuel (e.g., methane) and yields syngas (i.e., carbon monoxide and hydrogen). Reformer 210 may be configured to receive a fossil fuel 211 and by steam reforming yield a syngas stream 221.

Syngas stream 221, which can contain hydrogen, carbon dioxide, and often carbon monoxide may be directed to adsorber 220. Adsorber 220 may be configured to receive syngas stream 221 and substantially purify the hydrogen within the stream by separating out the carbon monoxide and carbon dioxide, producing a concentrated hydrogen stream 231. This separation may be done by the process of pressure swing adsorption (PSA) by a pressure swing adsorber. Adsorber 220 may have one or more adsorbent beds containing a mass of adsorbent, which discriminates between different gases such that carbon monoxide and carbon dioxide have a greater attraction to the adsorbent than hydrogen. The adsorbent may be, for example, activated carbon, silica gel, alumina, zeolite, or a species thereof.

Concentrated hydrogen stream 231 may be directed to humidifier 230. Humidifier 230 may be configured to add water vapor to concentrated hydrogen stream 231, producing a first humidified hydrogen stream 241. Humidifier 230 may be configured to control the level of humidity of first humidified hydrogen stream 241 to a predetermined level.

First humidified hydrogen stream 241 output from humidifier 230 may be directed to EHC 240. As described herein, it is advantageous to humidify the membrane of an EHC. Accordingly, first humidified hydrogen stream 241 may be configured to regulate the humidity of the membrane such that the electrical conductivity of the membrane may be maintained at an optimal level. Within EHC 240, first humidified hydrogen stream 241 may be compressed to produce a pressurized humidified hydrogen stream 242. EHC 240 may be a single stage or a multi-stage compressor. EHC 240 may be configured to pressurize first humidified hydrogen stream 241 up to high pressure. For example, pressurized humidified hydrogen stream 242 may be pressurized to a pressure of greater than about 500 psi, 1000 psi, 2500 psi, 5000 psi, 7500 psi, 10000 psi, 12500 psi, or 15000 psi.

Pressurized humidified hydrogen stream 242 output from EHC 240 may be directed to dryer 250. Pressurized humidified hydrogen stream 242 within dryer 250 may be directed to which ever bed (i.e., first bed 251 or second bed 252) may be online in production mode. According to the exemplary embodiment illustrated in FIG. 2, first bed 251 is online in production mode. For either bed, production mode may be defined as the mode during which pressurized humidified hydrogen stream 242 is supplied to the bed enabling at least a portion of the water vapor from pressurized humidified hydrogen stream 242 to be adsorbed thereby producing a product hydrogen stream 261. Although not shown in FIG. 2, alternatively, system 200 may be configured such that second bed 252 may be online in production mode and first bed 251 may be offline, in which case pressurized humidified hydrogen stream 242 may be directed to second bed 252.

First bed 251 and second bed 252 may each comprise a mass of adsorbent configured to discriminate between different gases such that water vapor has a greater attraction to the adsorbent than hydrogen. The adsorbent may be, for example, activated carbon, alumina, zeolite, or a species thereof. First bed 251 and second bed 252 may be configured to perform a variety of different adsorption separation processes. For example, first bed 251 and second bed 252 may utilize the process of pressure swing adsorption, or another similar process.

Dryer 250 may be configured such that within either first bed 251 or second bed 252 (i.e., whichever is in production mode) the water vapor within pressurized humidified hydrogen stream 242 may be adsorbed by the adsorbent while the pressurized hydrogen flows out of dryer 250 forming product hydrogen stream 261. Product hydrogen stream 261 may be directed to storage dispenser 260. Storage dispenser 260 may be any suitable storage container configured to contain pressurized hydrogen. Storage dispenser 260 may be stationary or a mobile container (e.g., tractor trailer tanker). Storage dispenser 260 may also be configured for dispensing product hydrogen 261.

During operation, the adsorbent in whichever bed is online (i.e., first bed 251 or second bed 252) may be become saturated. Saturation can occur when the bed reaches a breakthrough point (i.e., a slight humidity increase) and if operation continues may eventually reach complete saturation (i.e., the feed stream and product steam have the same humidity level). Breakthrough point may be when the adsorbent can no longer adsorb essentially all of the water vapor in pressurized humidified hydrogen stream 242 and as a result some water vapor remains in the stream and is carried out in product hydrogen stream 261. The saturation point may be when operation continues beyond the breakthrough point and the adsorbent reaches complete saturation such that no water vapor is separated out and therefore the humidity level of pressurized humidified hydrogen stream 242 is essentially the same as product hydrogen stream 261.

In operation, system 200 may be configured such that whichever bed is online in production mode (i.e., first bed 251 or second bed 252) may be taken offline based on reaching exhaustion. For example, the online bed may be taken offline before reaching the breakthrough point, upon reaching the breakthrough point, after reaching the breakthrough point, before reaching the saturation point, or upon reaching the saturation point. System 200 may be configured for continuous operation. Therefore, as one bed is taken offline and switched from production mode, the other bed can be brought online and switched to production. To avoid pressure spikes or flow disruption, during the transition, both beds (i.e., first bed 251 and second bed 252) may be brought online for a period of time before the exhausted bed is taken online. For example, as shown in FIG. 2, if first bed 251 reaches the exhaustion switching point then second bed 252 may be brought online and switched to production mode and once pressure and flow stabilizes, then first bed 251 may be switched out of production mode and brought offline.

Figure 3:
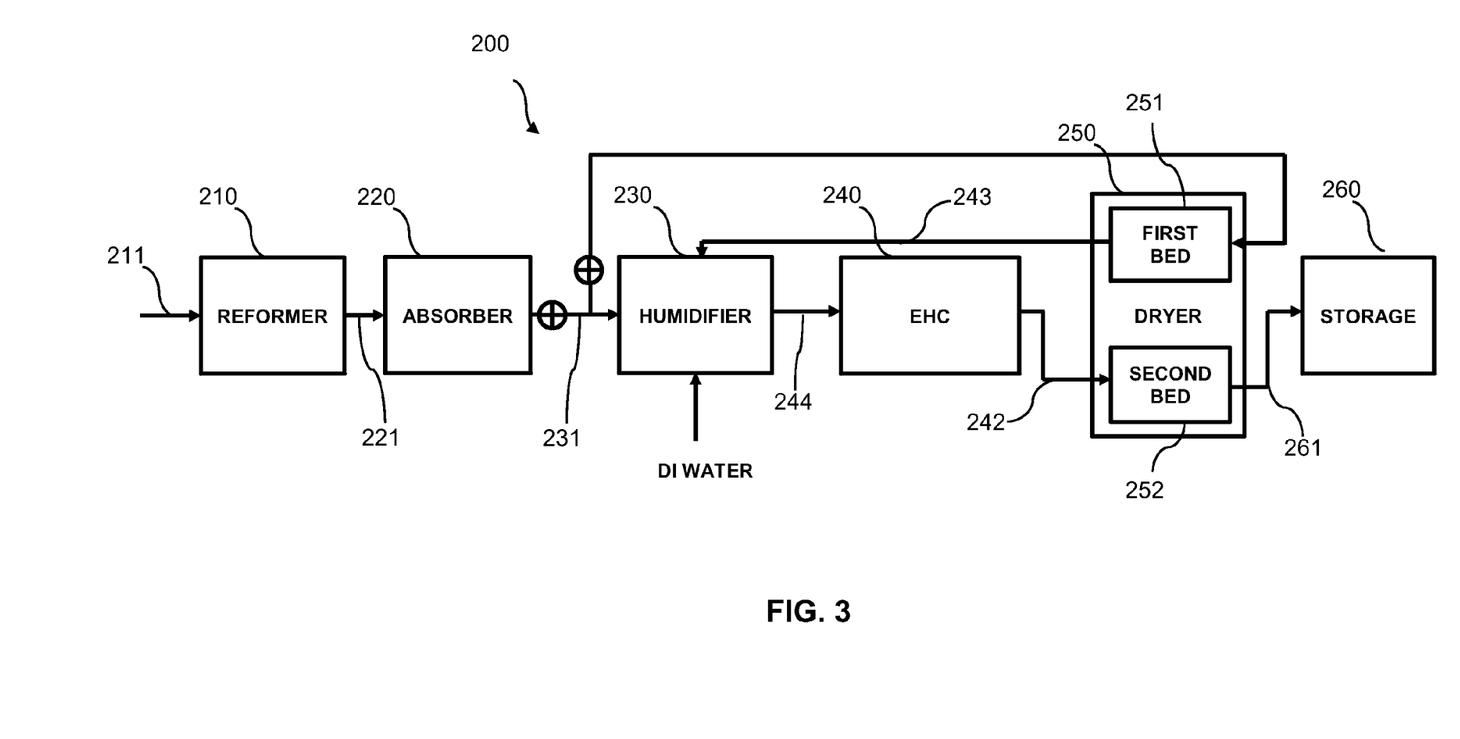
FIG. 3 is a flow schematic of a system for producing, compressing, and drying hydrogen for storage, according to an exemplary embodiment.

Once first bed 251 is switched out of production mode and brought offline, system 200 may switch first bed 251 to regeneration mode, as shown in FIG. 3. Regeneration mode may be defined as the mode during which the exhausted bed (e.g., first bed 251 or second bed 252) is regenerated by removing the impurities (e.g., water vapor) that has been adsorbed by the mass of adsorbent. As discussed herein, the traditional method of regenerating first bed 251 consisted of depressurizing the bed and then purging (e.g., blowing down) the bed to remove the water vapor using a product hydrogen stream 161, as shown in FIG. 1. However, using product hydrogen stream 161 decreases the overall throughput and diminishes the energy efficiency of the system and process.

In consideration of these disadvantageous, system 200 may be configured such that regeneration mode comprises blowing down the exhausted bed (i.e., first bed 251 as shown in FIG. 3) using a portion of or all of concentrated hydrogen stream 231, as shown in FIG. 3. Concentrated hydrogen stream 231 may be split and directed to both humidifier 230 as well as first bed 251 or concentrated hydrogen stream 231 may be directed entirely to humidifier 230 or entirely to dryer 250 (e.g., first bed 251 or second bed 252). For example, concentrated hydrogen stream 231 directed to first bed 251 may be configured to enter the outlet of first bed 251 such that concentrated hydrogen stream 231 flows countercurrent to the flow of pressurized humidified hydrogen 242 through first bed 251. Prior to blowing down, first bed 251 may depressurize on its own. During depressurization, concentrated hydrogen stream 231 may be totally isolated using inline valves or may be directed entirely to humidifier 230. Following depressurization, concentrated hydrogen stream 231 may be blown through first bed 251, purging and collecting the adsorbed particles (e.g., water vapor) thereby regenerating the mass of adsorbent while simultaneously humidifying concentrated hydrogen stream 231. As a result, concentrated hydrogen stream 231 blown through the first bed 251 may transform into a second humidified hydrogen stream 243. The regeneration performance using concentrated hydrogen stream 231 may be equal to or better than the regeneration performance using product hydrogen stream 161. For example, the latent humidity of product hydrogen stream 161 may be higher than that of concentrated hydrogen stream 231, therefore stream 231 may provide better regeneration performance.

As shown in FIG. 3, second humidified hydrogen stream 243 may be directed to humidifier 230 where additional water (e.g., DI water) may be introduced and/or may be combined with first humidified hydrogen stream 241 to form a combined humidified hydrogen stream 244 and be directed to EHC 240. According to some embodiments, when all of concentrated hydrogen stream 231 is directed to dryer 250 for regeneration, second humidified hydrogen stream 243 directed to humidifier 230 may produce the entire humidified hydrogen stream 244. System 200 as described herein enables recirculation of the water vapor captured by dryer 250 back to EHC 240. By recycling the water vapor, less water is used during the operation of system 200. Although not shown in FIG. 3, in other embodiments, a portion of second humidified hydrogen stream 243 may be supplied to a burner, vent, or stack.

System 200 may be configured such that following regeneration of first bed 251, first bed 251 may be switched to a standby mode. First bed 251 may remain in standby mode until second bed 252 becomes exhausted at which time first bed 251 may be switched to production mode.

It is contemplated that in other embodiments, dryer 250 may have more beds than just first bed 251 and second bed 252. Dryer 250 may have a plurality of beds, for example, three beds, four beds, five beds, or more. Embodiments where dryer 250 has more than two beds, dryer 250 may be configured such that the combination of beds online in production mode and offline in either standby or regeneration mode may vary. For example, wherein dryer 250 has three beds, two beds may be online in production mode while the other bed is offline in regeneration mode or standby mode. Alternatively, dryer 250 having three beds could be operating such that only one bed is online in production mode while the other beds are offline in either regeneration mode or standby mode. The number of beds online in production mode may be varied based the desired flowrate for product hydrogen stream 261.

It is also contemplated that dryer 250 and system 200 may be configured such that multi beds may be in production mode simultaneously. For example, additional beds may be put in production mode in response to an increase in the flow rate of hydrogen stream 242.

It is contemplated that in other embodiments concentrated hydrogen stream 231 may be produced or supplied by alternative means, which may enable the elimination of reformer 210 and adsorber 220. For example, dry hydrogen stream 231 may be generated by electrolysis, etc.

System 200 may further include a plurality of instruments (e.g., temperature transmitters, pressure transmitters, humidity transmitters, flow meters, and the like), a plurality of pumps (e.g., centrifugal pumps, rotary lobe pumps, diaphragm pumps, and the like), and a plurality of valves (e.g., ball valves, butterfly valves, control valves, pressure relief valves, and the like). The plurality of instruments, pumps, and valves can be used to control the flow rate, temperature, concentration, location of the various streams. System 200 may further include a control system configured to interface with the plurality of instruments, plurality of valves, and plurality of pumps. The control system can include a computer, PLC, or the like that can be programmed to control system 200 manually, automatically, or a combination of both.

Figure 4:
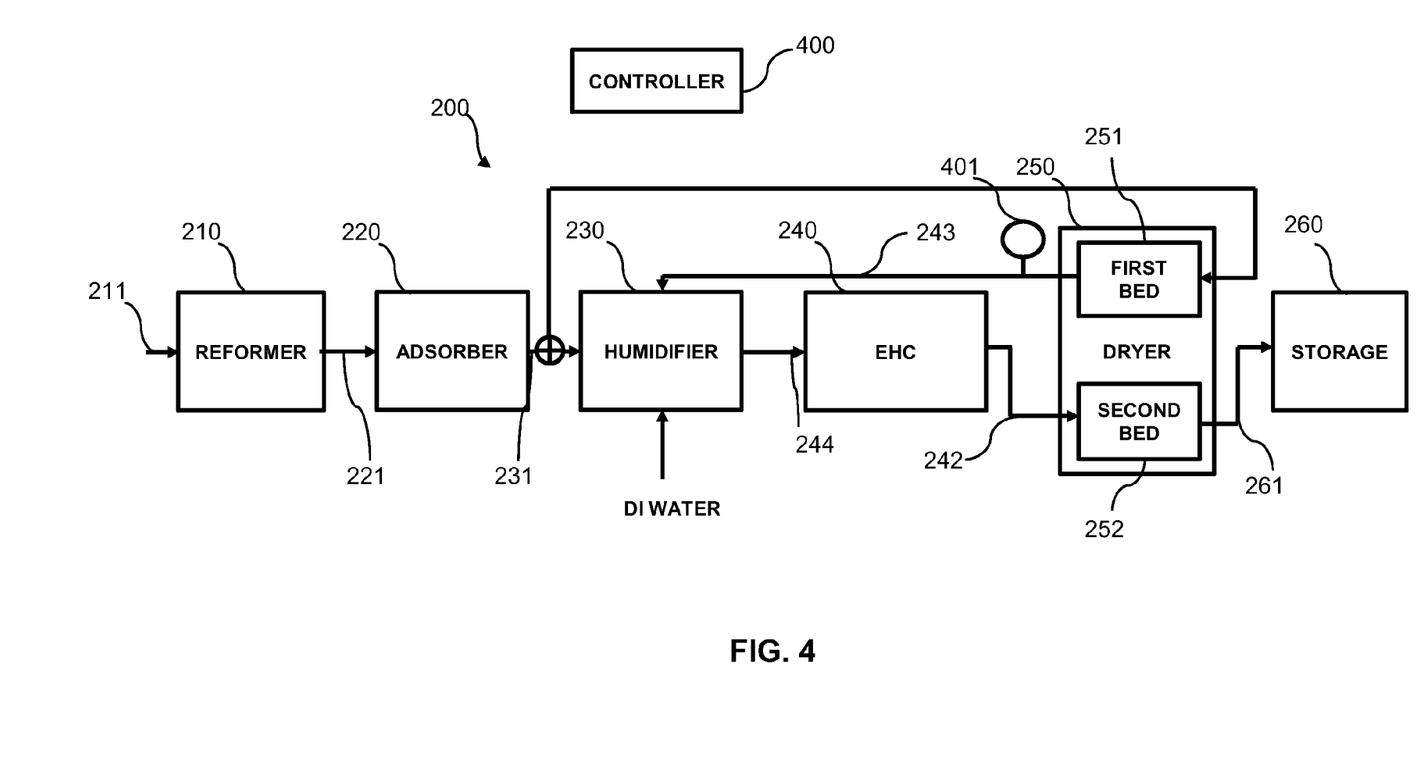
FIG. 4 is a flow schematic of a system for producing, compressing, and drying hydrogen for storage, according to an exemplary embodiment.

For example, system 200 as shown in FIG. 4 may include a controller 400 and humidity transmitter 401. Humidity transmitter 401 may be configured to detect the humidity level of second humidified hydrogen stream 243, which may vary depending on numerous factors (e.g., flow rate of hydrogen stream 243, level exhaustion of first bed 251, and the point of regeneration mode). The variability of second humidified hydrogen stream 243 may cause variability in the amount of water that may be added to second humidified hydrogen stream 243. To limit variability, controller 400 may be configured to receive the humidity level of hydrogen stream 243 and then control humidifier 230, such that the characteristics (i.e., flow rate, pressure, humidity level, etc.) of combined hydrogen stream 244 remains substantially the same. System 200 may further comprise one or more flow meters (not shown) in communication with controller 400, configured to detect the flow rate of, for example, hydrogen stream 243 such that controller 400 may be configured to perform mass balance calculations to further optimize the blending of the two hydrogen streams and minimize unintended fluctuations in combined humidified hydrogen stream 244.

Figure 5:
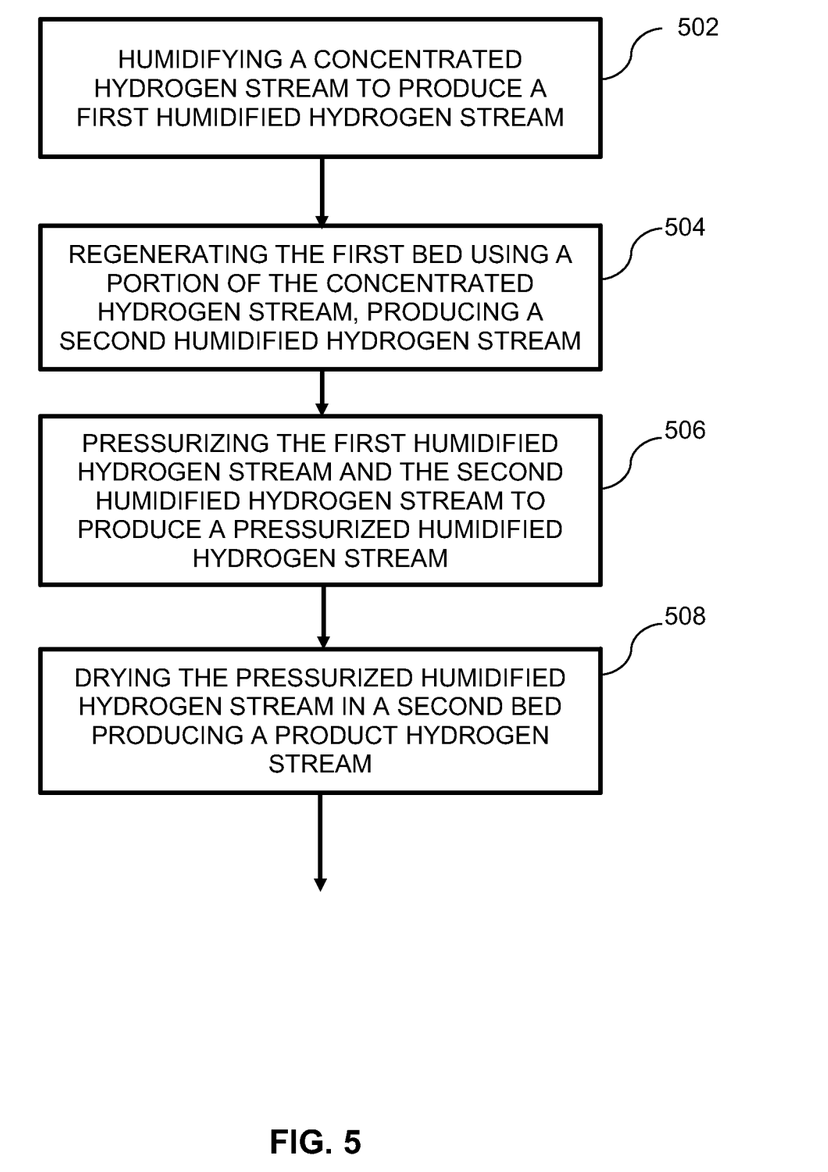
FIG. 5 is a flow chart illustrating an exemplary disclosed method of operating the power system of FIGS. 2-4.

FIG. 5 illustrates an exemplary system process performed by system 200. The disclosed system may be applicable to other fluid processing applications besides hydrogen processing as described herein. The disclosed system as described herein may enable increased throughput and energy efficiency as well increased water recycling. Operation of the system will now be explained with reference to FIG. 5

System 200 may operate by humidifying concentrated hydrogen stream 231 to produce a first humidified hydrogen stream 241, at step 502. At step 504, system 200 may be regenerating first bed 251 using a portion of concentrated hydrogen stream 231, producing second humidified hydrogen stream 243. At step 506, system 200 may be pressurizing first humidified hydrogen stream 241 and second humidified hydrogen stream 243 to produce a pressurized hydrogen stream 242. System 200 at step 508, may dry the pressurized humidified hydrogen stream in second bed 252, producing product hydrogen stream 261.

It will be apparent to those skilled in the art that various modifications and variations can be made to the disclosed system and method. Other embodiments will be apparent to those skilled in the art from consideration of the specification and practice of the disclosed system and method. It is intended that the specification and examples be considered as exemplary only, with a true scope being indicated by the following claims and their equivalents.

What is claimed is:

1. A system for compressing hydrogen, comprising:
a humidifier configured to receive and humidify a concentrated hydrogen stream and produce a first humidified hydrogen stream;
a compressor configured to receive and compress the first humidified hydrogen stream, and produce a pressurized humidified hydrogen stream; and
a dryer including a first bed configured to:
in production mode receive the pressurized humidified hydrogen stream and absorb at least a portion of the humidity, producing a product hydrogen stream; and
in regeneration mode receive a portion of the concentrated hydrogen stream to regenerate the first bed producing a second humidified hydrogen stream.

2. The system of claim 1, wherein the second humidified hydrogen is supplied to the compressor while the dryer is in regeneration mode.

3. The system of claim 2, wherein the dryer further includes a second bed being configured to:
in production mode receive the pressurized humidified hydrogen stream and adsorb at least a portion of the humidity, producing a product hydrogen stream; and
in regeneration mode receive a portion of the concentrated hydrogen stream to regenerate the second bed producing a second humidified hydrogen stream, and supply the second humidified hydrogen stream to the compressor.

4. The system of claim 3, wherein the second bed is configured to operate in production mode while the first bed operates in regeneration mode.

5. The system of claim 1, wherein the compressor is an electrochemical hydrogen compressor.

6. The system of claim 1, wherein the first bed is a pressure swing adsorption bed.

7. The system of claim 1, further comprising:
a steam reformer configured to process a fossil fuel to produce a syngas stream;
a rapid cycle pressure swing adsorption unit configured to receive the syngas stream and purify the syngas stream to produce the concentrated hydrogen stream.

8. The system of claim 3, wherein the system is configured such that either the first bed or the second bed is in production mode while the system is operating.

9. The system of claim 1, wherein the first humidified hydrogen stream and the second humidified hydrogen stream are combined to form a combined humidified hydrogen stream prior to entering the compressor and a controller is configured to control the humidity of the combined humidified hydrogen stream by controlling the humidifier.

10. The system of claim 1, wherein the humidity of the concentrated hydrogen stream is less than the humidity of the product hydrogen stream.

11. A method of operating a dryer, wherein the dryer has a first bed and a second bed, the method comprising:
humidifying, in a humidifier, a concentrated hydrogen stream to produce a first humidified hydrogen stream;
regenerating the first bed using a portion of the concentrated hydrogen stream, producing a second humidified hydrogen stream;
pressurizing the first humidified hydrogen stream and the second humidified hydrogen stream to produce a pressurized humidified hydrogen stream; and
drying the pressurized humidified hydrogen stream in the second bed producing a product hydrogen stream.

12. The method of claim 11, where in drying the pressurized humidified hydrogen stream includes performing pressure swing adsorption.

13. The method of claim 11, wherein the first humidified hydrogen stream and the second humidified hydrogen streams are pressurized using an electrochemical compressor.

14. The method of claim 11, further comprising:
steam reforming a fossil fuel to produce a syngas stream; and
using rapid cycle pressure swing adsorption to purify the syngas stream to produce the concentrated hydrogen stream.

15. The method of claim 11, further comprising switching the drying from the second bed to the first bed when the first bed reaches an exhaustion point and beginning regeneration of the second bed.

16. A dryer configured for drying a pressurized hydrogen stream, comprising:
a first bed being configured to:
in production mode receive a pressurized humidified hydrogen stream and adsorb at least a portion of the humidity, producing a product hydrogen stream;
in regeneration mode receive a portion of a concentrated hydrogen stream to regenerate the first bed producing a second humidified hydrogen stream, and supply the second humidified hydrogen stream to a compressor through a humidifier;
a second bed being configured to:
in production mode receive the pressurized humidified hydrogen stream and adsorb at least a portion of the humidity, producing a product hydrogen stream; and
in regeneration mode receive a portion of the concentrated hydrogen stream to regenerate the second bed producing a second humidified hydrogen stream, and supply the second humidified hydrogen stream to the compressor through a humidifier.

17. The dryer of claim 16, wherein the dryer is configured such that either the first bed or the second bed is always in production mode while the dryer is operating.

* * * * *